United States Patent
Le et al.

(10) Patent No.: US 11,532,325 B1
(45) Date of Patent: Dec. 20, 2022

(54) TWO-DIMENSIONAL MAGNETIC RECORDING (TDMR) FOR HIGH AREAL DENSITY TAPE DRIVE

(71) Applicant: Western Digital Technologies, Inc., San Jose, CA (US)

(72) Inventors: Quang Le, San Jose, CA (US); Xiaoyong Liu, San Jose, CA (US); Zhigang Bai, Fremont, CA (US); Kuok San Ho, Emerald Hills, CA (US); Hisashi Takano, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/551,981

(22) Filed: Dec. 15, 2021

(51) Int. Cl.
 *G11B 5/584* (2006.01)
 *G11B 5/55* (2006.01)
 *G11B 5/008* (2006.01)

(52) U.S. Cl.
 CPC .......... *G11B 5/584* (2013.01); *G11B 5/00813* (2013.01); *G11B 5/5504* (2013.01)

(58) Field of Classification Search
 None
 See application file for complete search history.

(56) References Cited

U.S. PATENT DOCUMENTS

| | | | |
|---|---|---|---|
| 5,291,348 A * | 3/1994 | Copolillo | G11B 21/103 |
| 8,638,513 B1 * | 1/2014 | Burd | G11B 5/012 360/39 |
| 8,885,277 B1 | 11/2014 | Erden et al. | |
| 9,286,926 B1 | 3/2016 | Dhanda et al. | |
| 9,495,986 B2 | 11/2016 | Cherubini et al. | |
| 9,728,221 B2 | 8/2017 | Oberg et al. | |
| 2001/0022711 A1 * | 9/2001 | Blatchley | G11B 21/04 |
| 2003/0090837 A1 * | 5/2003 | Ozue | G11B 5/4976 |
| 2009/0002896 A1 * | 1/2009 | Mallary | G11B 5/11 |
| 2009/0251821 A1 * | 10/2009 | Song | G11B 5/1278 360/110 |
| 2010/0265612 A1 | 10/2010 | Jaquette | |

(Continued)

OTHER PUBLICATIONS

Biskeborn, Robert G. et al., "TMR tape drive for a 15 TB cartridge", American Institute of Physics, Dec. 26, 2017, <https://aip.scitation.org/doi/10.1063/1.5007788>.

(Continued)

*Primary Examiner* — Peter Vincent Agustin
(74) *Attorney, Agent, or Firm* — Patterson & Sheridan, LLP; Steven H. VerSteeg

(57) ABSTRACT

The present disclosure is generally related to a tape drive including a tape head configured to read shingled data tracks on a tape. The tape head comprises a first module head assembly aligned with a second module head assembly. Both the first and second module head assemblies comprises one or more servo heads and a plurality of data heads. Each data head comprises a write head, a first read head aligned with the write head, and a second read head offset from the first read head in both a cross-track direction and a down-track direction. The first read heads and the second read heads are configured to read data from a shingled data track of the tape simultaneously. In some embodiments, the tape head is able to be dynamically tilted in order to tilt the first and second reads heads when reading curved portions of shingled data tracks.

20 Claims, 7 Drawing Sheets

(56) References Cited

U.S. PATENT DOCUMENTS

| | | | |
|---|---|---|---|
| 2011/0102942 A1* | 5/2011 | Bai | G11B 5/3116 216/22 |
| 2011/0199701 A1* | 8/2011 | Bui | G11B 5/584 |
| 2012/0206832 A1* | 8/2012 | Hamidi | G11B 5/584 360/75 |
| 2013/0321949 A1* | 12/2013 | Cherubini | G11B 5/187 360/122 |
| 2014/0177091 A1* | 6/2014 | Urakami | G11B 5/3116 29/603.07 |
| 2015/0262598 A1* | 9/2015 | Wilson | G11B 5/4886 369/53.39 |
| 2016/0055871 A1* | 2/2016 | Biskeborn | G11B 5/4893 360/241.1 |

OTHER PUBLICATIONS

Musha, Atsushi, "A Study of TDMR for Magnetic Tape Systems", Fujifilm Corporation, pp. 1-2, <http://tmrc2018.ucsd.edu/Archive/P1-15.pdf>.

Alexander, James et al., "Exploring Two-Dimensional Magnetic Recording Gain Constraints", IEEE Transactions on Magnetics, vol. 53, No. 2, Feb. 2017, pp. 1-4, <https://www.researchgate.net/publication/308186823_Exploring_TDMR_Gain_Constraints>.

* cited by examiner

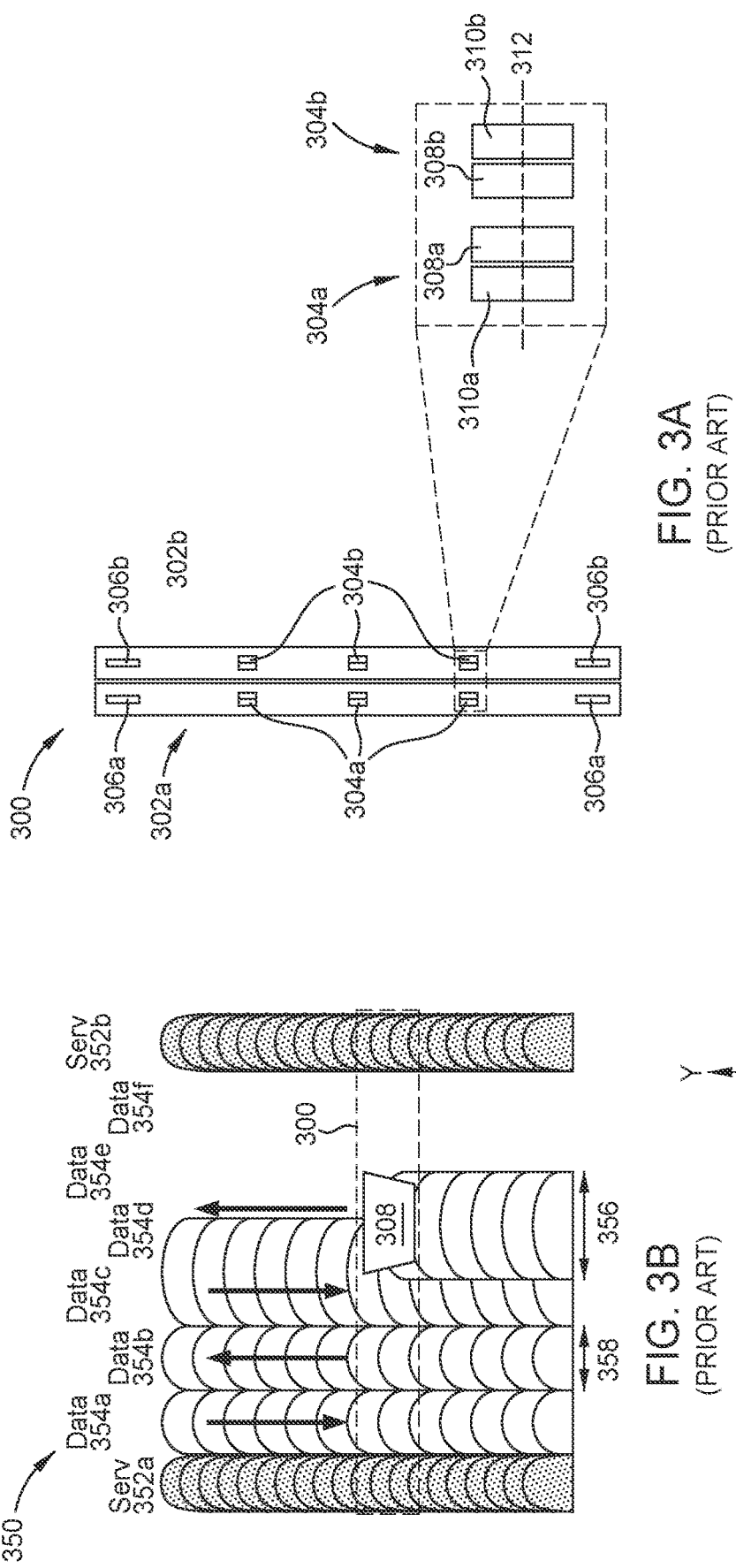

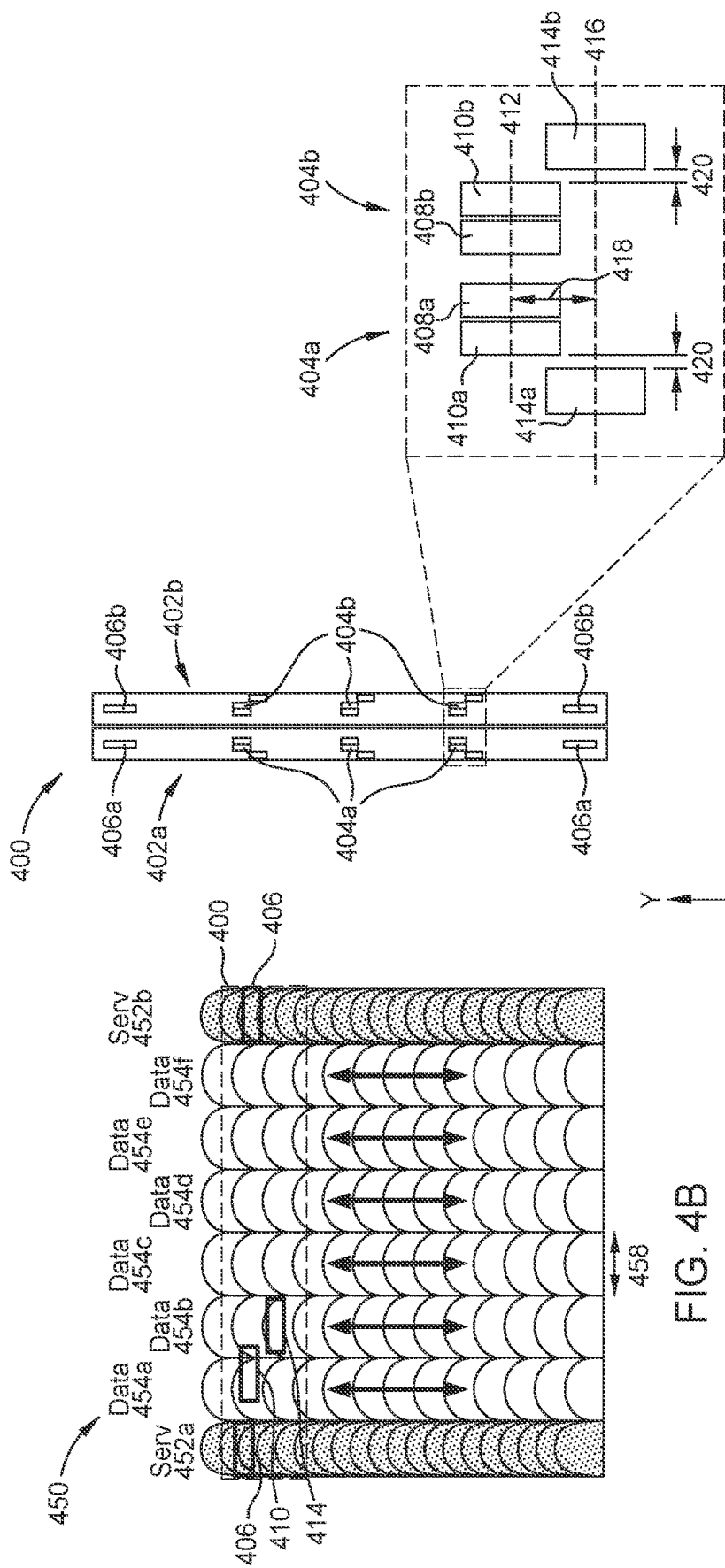

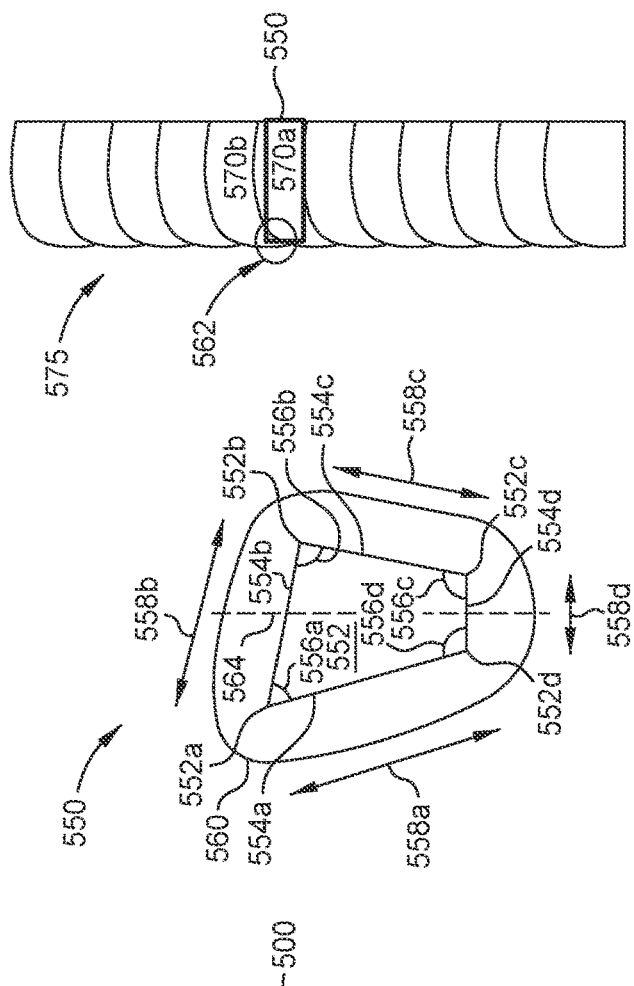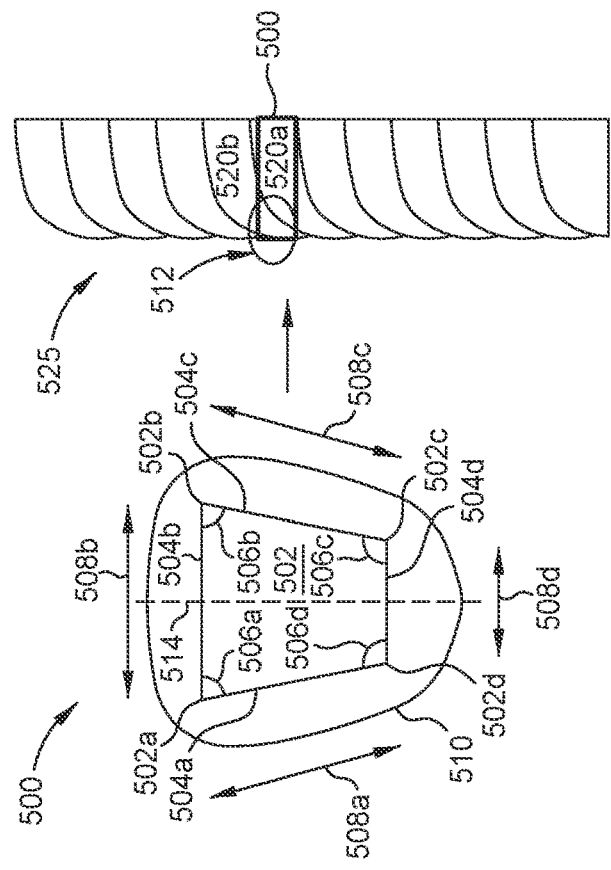

TWO-DIMENSIONAL MAGNETIC RECORDING (TDMR) FOR HIGH AREAL DENSITY TAPE DRIVE

BACKGROUND OF THE DISCLOSURE

Field of the Disclosure

Embodiments of the present disclosure generally relate to a tape head and a tape drive including a tape head.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a position over the media where the data is to be stored. The magnetic write transducer then generates a magnetic field, which encodes the data into the magnetic media. Data is read from the media by similarly positioning the magnetic read transducer and then sensing the magnetic field of the magnetic media.

In a tape drive system, the quantity of data stored on a magnetic tape may be increased by increasing the number of data tracks across the tape that the tape head is capable of writing to. By overlapping portions of data tracks (e.g., shingling data tracks), improvements to data storage quantities can be achieved. However, for various reasons, the tape head often has a writer width that is greater than the track pitch or track width of the data tracks of the tape. Thus, after writing a data track, the tape head overwrites a portion of that data track when writing the adjacent data track. Because portions of the data tracks are overwritten, one side of each trimmed data track suffers track edge curvature such that the trimmed data tracks are asymmetrical. As such, the trimmed data tracks are narrower than the writer width, and the read heads of the tape head need to be sufficiently narrow in order to read the data of the trimmed data tracks. However, narrowing the read heads too much may result in a reduction of the read head signals or in the signal-to-noise ratio. As such, the tape head may be more prone to read error.

Therefore, there is a need in the art for an improved tape head able to read data from a shingled data track without decreasing the signal-to-noise ratio.

SUMMARY OF THE DISCLOSURE

The present disclosure is generally related to a tape drive including a tape head configured to read shingled data tracks on a tape. The tape head comprises a first module head assembly aligned with a second module head assembly. Both the first and second module head assemblies comprises one or more servo heads and a plurality of data heads. Each data head comprises a write head, a first read head aligned with the write head, and a second read head offset from the first read head in both a cross-track direction and a down-track direction. The first read heads and the second read heads are configured to read data from a shingled data track of the tape simultaneously. In some embodiments, the tape head is able to be dynamically tilted in order to tilt the first and second reads heads when reading curved portions of shingled data tracks.

In one embodiment, a tape head comprises a first module head assembly, comprising: one or more servo heads, and a plurality of data heads, each data head comprising: a write head, a first read head aligned with the write head, and a second read head, the second read head being offset in a cross-track direction and in a down-track direction from the first read head and the write head.

In another embodiment, a tape head comprises a first module head assembly, comprising: one or more first servo heads, and a plurality of first data heads, each first data head comprising: a first write head, a first read head aligned with the first write head, and a second read head, the second read head being offset in a cross-track direction and in a down-track direction from the first read head and the first write head. The tape head further comprises a second module head assembly aligned with the first module head assembly, the second module head assembly comprising: one or more second servo heads, and a plurality of second data heads, each second data head comprising: a second write head, a third read head aligned with the second write head, and a fourth read head, the fourth read head being offset in the cross-track direction and in the down-track direction from the third read head and the second write head.

In yet another embodiment, a tape drive comprises a first module head assembly, comprising: one or more first servo heads, and a plurality of first data heads, each first data head comprising: a first write head configured to write data to a tape, a first read head aligned with the first write head, and a second read head, the second read head being offset in a cross-track direction and in a down-track direction from the first read head and the first write head, wherein the first read head and the second read head are configured to read data from a first shingled data track of a tape simultaneously, and means for dynamically tilting the first module head assembly.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3A illustrates a conventional tape head.

FIG. 3B illustrates the conventional tape head of FIG. 3A write and read shingled data to a tape or media.

FIG. 4A illustrates a tape head, according to one embodiment.

FIG. 4B illustrates the tape head of FIG. 4A write and read shingled data to a tape or media, according to one embodiment.

FIGS. 5A-5B illustrate a symmetric write pole and a symmetric write field of a write head, according to one embodiment.

FIGS. 5C-5D illustrate an asymmetric write pole and an asymmetric write field of a write head, according to another embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure is generally related to a tape drive including a tape head configured to read shingled data tracks on a tape. The tape head comprises a first module head assembly aligned with a second module head assembly. Both the first and second module head assemblies comprises one or more servo heads and a plurality of data heads. Each data head comprises a write head, a first read head aligned with the write head, and a second read head offset from the first read head in both a cross-track direction and a down-track direction. The first read heads and the second read heads are configured to read data from a shingled data track of the tape simultaneously. In some embodiments, the tape head is able to be dynamically tilted in order to tilt the first and second reads heads when reading curved portions of shingled data tracks.

Figure 1A:
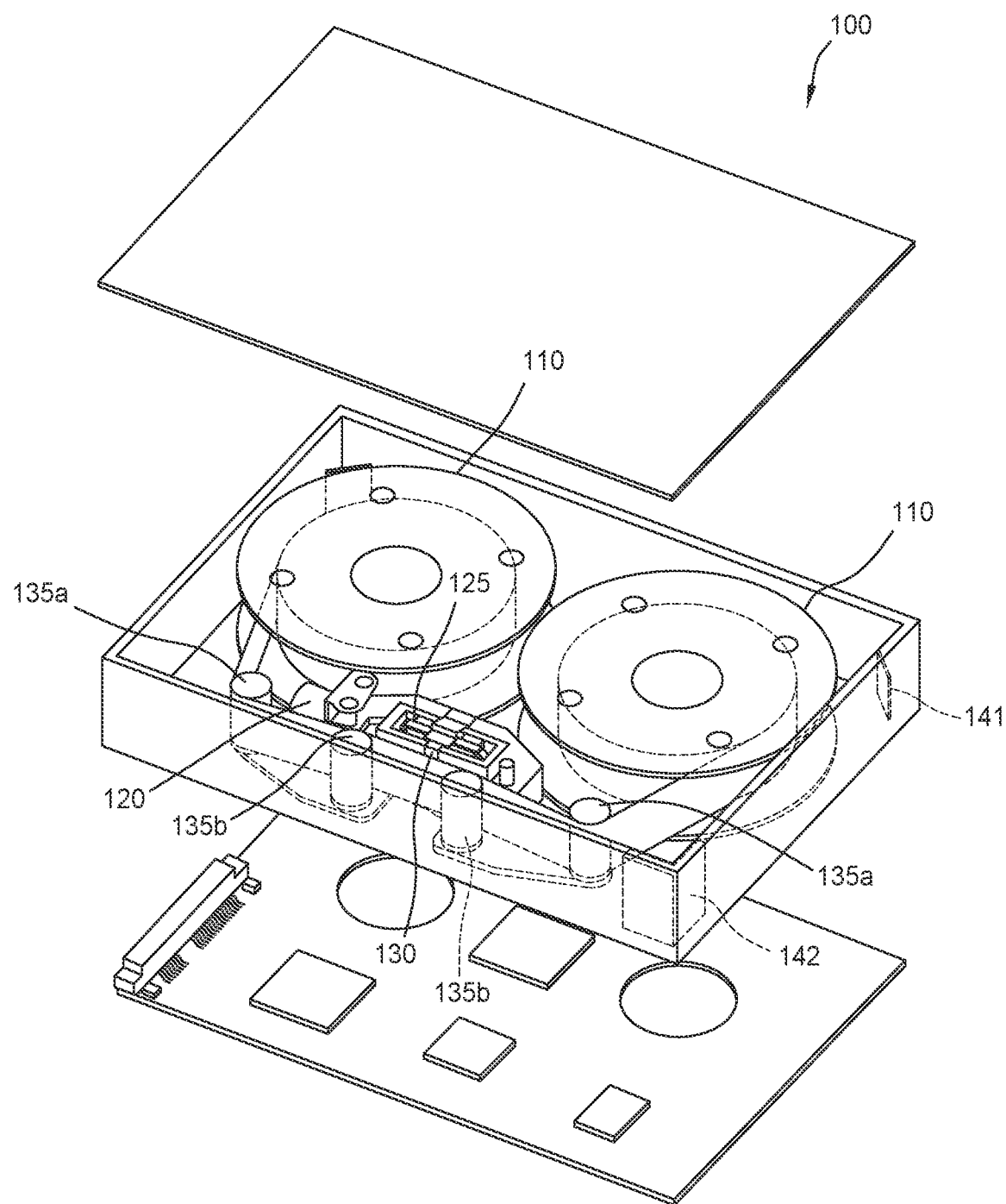
FIGS. 1A-1C illustrate a perspective exploded view, a simplified top down, and side profile view of a tape drive, in accordance with some embodiments.
Figure 1B:
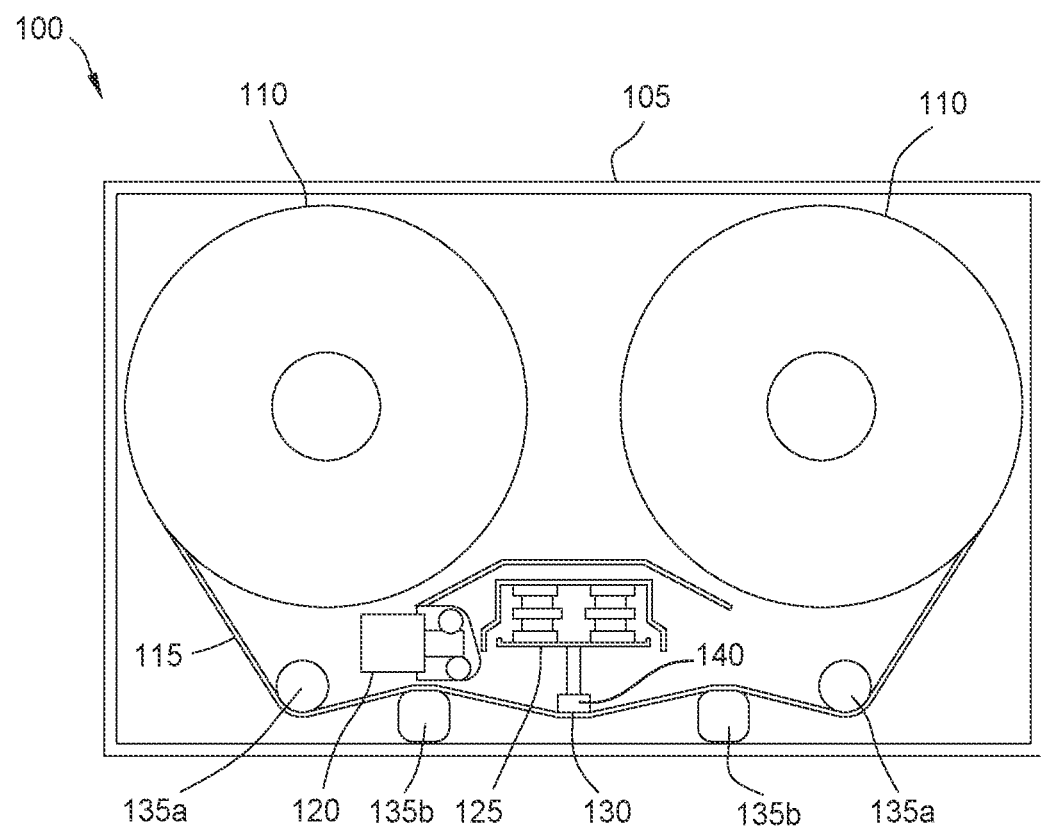
Figure 1C:
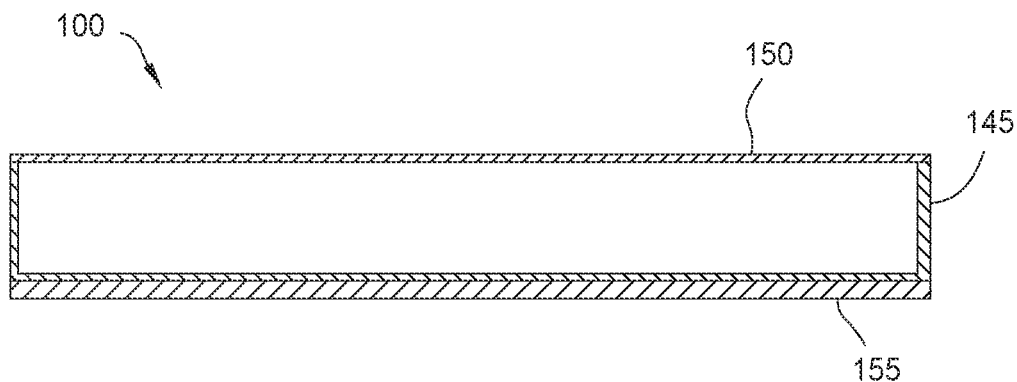

FIGS. 1A-1C illustrate a perspective exploded view, a simplified top down, and side profile view of a tape drive 100, in accordance with some embodiments. The tape drive 100 may be a tape embedded drive (TED).

Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller integrated circuits (IC) (or more simply "a controller") (e.g., in the form of one or more System on Chip (SoC)), along with other digital and/or analog control circuitry to control the operations of the drive. For example, the controller and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller. As an example, the controller may be configured to execute firmware instructions for the various same gap verify embodiments described below.

Figure 2:
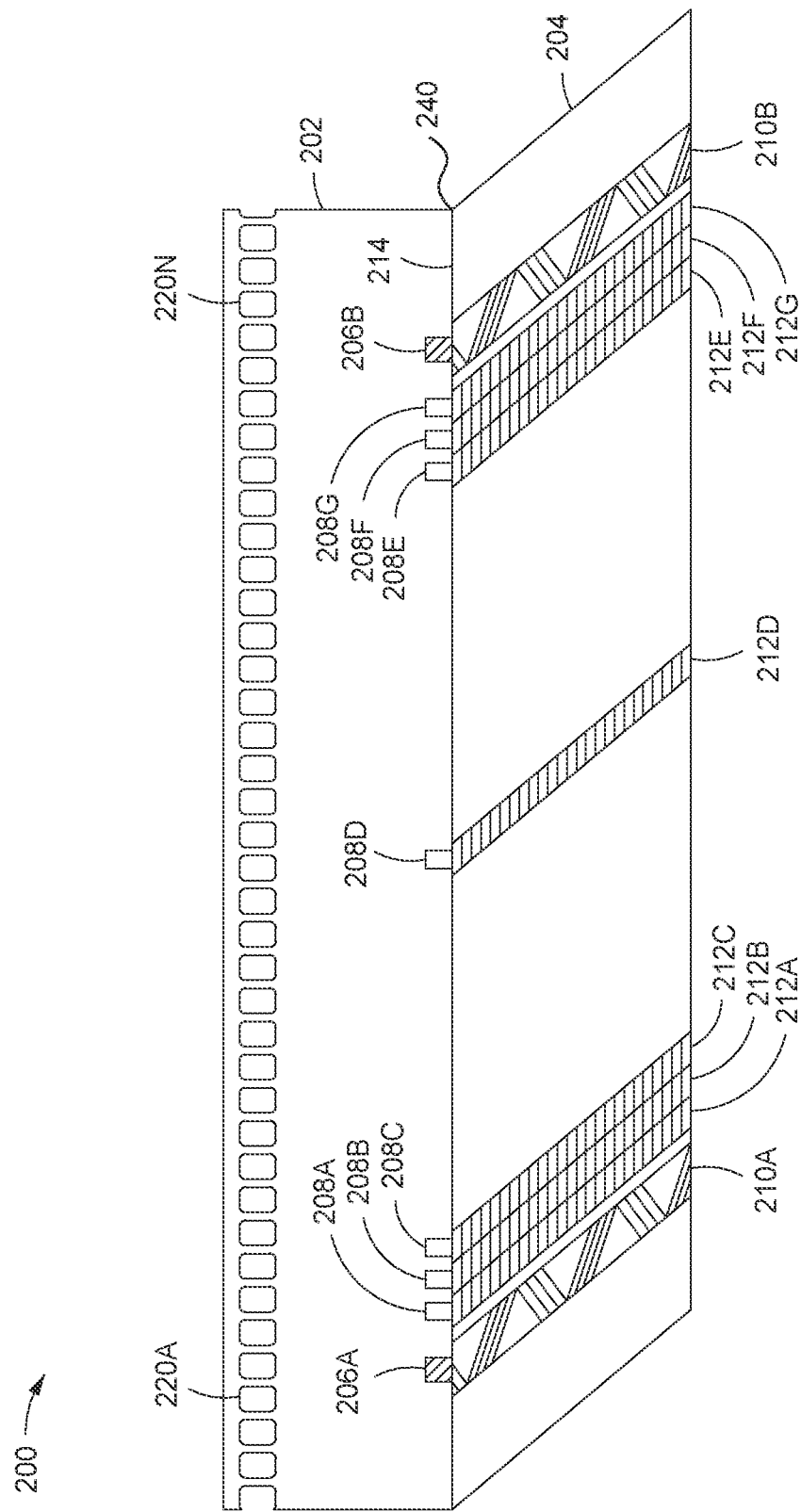
FIG. 2 is a schematic illustration of a tape head and tape that are aligned.

FIG. 2 is a schematic illustration of a tape head module assembly 200 and a tape 204 that are aligned. The tape head module assembly 200 comprises a tape head body 202 that is aligned with the tape 204. The tape 204 moves past the tape head module assembly 200 during read and/or write operations. The tape head module assembly 200 has a media facing surface (MFS) 214 that faces the tape 204.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape drive 200 to align the data heads 208A-208G such that the center data track (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

FIG. 3A illustrates a conventional tape head 300. FIG. 3B illustrates the conventional tape head 300 of FIG. 3A write and read shingled data to a tape 350 or media.

The conventional tape head 300 comprises a first head assembly 302*a* and a second head assembly 302*b*, which are mirror images of one another. The first head assembly 302*a* comprises a plurality of first data heads 304*a* and one or more first servo heads 306*a*. The plurality of first data heads 304*a* are each aligned in the y-axis. The second head assembly 302*b* comprises a plurality of second data heads 304*b*, and one or more second servo heads 306*b*. The plurality of second data heads 304*b* are each aligned in the y-axis. The first data heads 304*a* and the second data heads 304*b* may collectively be referred to as data heads 304. The first servo heads 306*a* and the second servo heads 306*b* may collectively be referred to as servo heads 306. While each head assembly 302*a*, 302*b* illustrates three data heads 304 and two servo heads 306, each head assembly 302*a*, 302*b* may comprise a greater or lesser number of both data heads 304 and servo heads 306. As such, the number of data heads 304 and the number of servo heads 306 is not intended to be limiting.

Each of the first data heads 304a comprises a write head 308a and a read head 310a, and each of the second data heads 304b comprises a write head 308b and a read head 310b. Each first data head 304a of the first head assembly 302a is aligned with a second data head 304b of the second head assembly 302b along a central axis 312 (e.g., the x-axis). More specifically, each write head 308a of the first head assembly 302a faces or is adjacent to a write head 308b of the second head assembly 302b. As such, the read head 310a, the write head 308a, the write head 308b, and the read head 310b are all aligned along a central axis 312 (e.g., the x-axis). In some embodiments, the first servo heads 306a are aligned with the read head 310a of each first data head 304a in the y-axis, and the second servo heads 306b are aligned with the read head 310b of each second data head 304b in the y-axis. The read heads 310a, 310b may collectively be referred to as read heads 310, and the write heads 308a, 308b may collectively be referred to as write heads 308.

The write heads 308a, 308b are configured to write data to a plurality of data tracks 354a-354f of the tape 350, and the read heads 310a, 310b are configured to read data from the plurality of data tracks 354a-354f. The data tracks 354a-354f may collectively be referred to as data tracks 354. The servo heads 306 are configured to read data from servo tracks 352a, 352b of the tape 350 to measure the speed and position of the data heads 304a, 304b in order to properly align the data heads 304a, 304b with the respect to the data tracks 354. When writing data to the data tracks, the tape head 300 has a writer width 356 that is greater than the track pitch or track width of the data tracks 354. Thus, after writing a data track 354c, for example, the tape head 300 overwrites a portion of the data track 354c when writing the adjacent data track 354d such that that previously written data track 354c has a smaller overall width 358. Because portions of the data tracks 354 are overwritten, one side of each trimmed data track 354 suffers track edge curvature such that the trimmed data tracks 354 are a bit asymmetrical.

Because the trimmed data tracks 354 are narrower than the writer width 356, the read heads 310 of the tape head 300 need to be sufficiently narrow in order to read the data of the trimmed data tracks 354. However, narrowing the read heads 310 too much may result in a reduction of the read head signals or in the signal-to-noise ratio. As such, the tape head 300 may be more prone to read error.

Figure 4D:
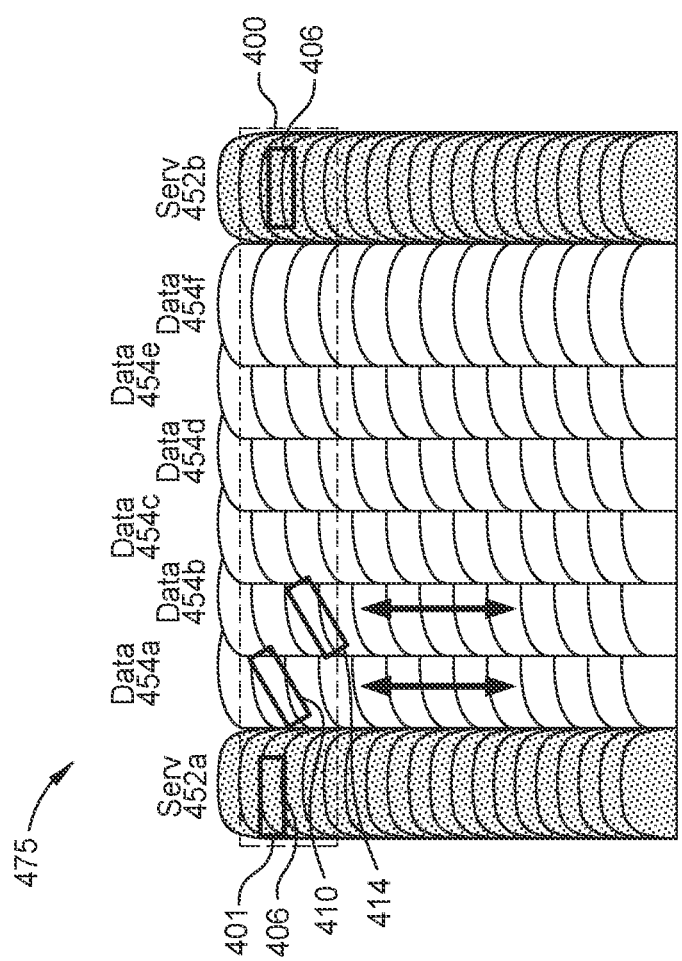
FIGS. 4C-4D illustrate read heads of the tape head of FIG. 4A being tilted to read data from a data track of the tape of FIG. 4B, according to one embodiment.
Figure 4C:
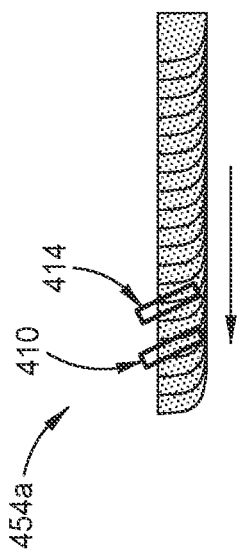

FIG. 4A illustrates a tape head 400, according to one embodiment. FIG. 4B illustrates the tape head 400 of FIG. 4A write and read shingled data to a tape 450 or media, according to one embodiment. FIGS. 4C-4D illustrate read heads 410, 414 of the tape head 400 of FIG. 4A being tilted to read data from a data track 454a of the tape 450 of FIG. 4B, according to one embodiment. The tape head 400 may be within the tape drive 100 of FIGS. 1A-1C. The tape head 400 may be the tape head module assembly 200 of FIG. 2.

The tape head 400 comprises a first head assembly 402a and a second head assembly 402b, which are mirror images of one another. The first head assembly 402a comprises a plurality of first data heads 404a and one or more first servo heads 406a. The plurality of first data heads 404a are each aligned in the y-axis. The second head assembly 402b comprises a plurality of second data heads 404b, and one or more second servo heads 406b. The plurality of second data heads 404b are each aligned in the y-axis. The first data heads 404a and the second data heads 404b may collectively be referred to as data heads 404. The first servo heads 406a and the second servo heads 406b may collectively be referred to as servo heads 406. While each head assembly 402a, 402b illustrates three data heads 404 and two servo heads 406, each head assembly 402a, 402b may comprise a greater or lesser number of both data heads 404 and servo heads 406. As such, the number of data heads 404 and the number of servo heads 406 is not intended to be limiting.

Each of the first data heads 404a comprises a write head 408a, a first read head 410a, and a second read head 414a, and each of the second data heads 404b comprises a write head 408b, a first read head 410b, and a second read head 414b. The first read head 410a and the write head 408a of the first head assembly 404a are aligned along a first central axis 412 (e.g., the x-axis), and the second read head 414a is offset in the y-direction (down-track direction) and the x-direction (cross-track direction) from the first central axis 412.

Similarly, the second read head 410b and the write head 408b of the second head assembly 404b are aligned along the first central axis 412 (e.g., the x-axis), and the second read head 414b is offset in the y-direction (down-track direction) and the x-direction (cross-track direction) from the first central axis 412. Each write head 408a of the first head assembly 402a faces or is adjacent to a write head 408b of the second head assembly 402b. The second read head 414a of the first head assembly 404a is aligned along a second central axis 416 (e.g., in the x-direction) with the second read head 414b of the second head assembly 404b. The write head 408a and the first read head 410a of the first head assembly 404a are aligned along the first central axis 412 with the write head 408b and the first read head 410b of the second head assembly 404b. The first read heads 410a, 410b may collectively be referred to as first read heads 410, the second read heads 414a, 414b may collectively be referred to as second read heads 414, and the write heads 408a, 408b may collectively be referred to as write heads 408.

In some embodiments, the first servo heads 406a are aligned with the first read head 410a of each first data head 404a in the y-axis, and the second servo heads 406b are aligned with the first read head 410b of each second data head 404b in the y-axis. In other embodiments, the first servo heads 406a are aligned with the second read head 414a of each first data head 404a in the y-axis, and the second servo heads 406b are aligned with the second read head 414b of each second data head 404b in the y-axis.

Each second read head 414a, 414b is offset a first distance 418 up to the width 458 of a data track 454 in the cross-track or y-direction (i.e., from the first central axis 412 to the second central axis 416) from the respective first read head 410a, 410b depending on the desired areal density capacity. For example, the first distance 418 may be greater if a lower areal density capacity is desired, or the first distance 418 may be smaller if a higher areal density capacity is desired. Each second read head 414a, 414b is offset a second distance 420 of about 100 nm to about 500 nm in the down-track or x-direction from the respective first read head 410a, 410b depending on the desired areal density capacity. While the second read heads 414a, 414b are shown to be offset from the first read heads 410a, 410b in the −y-direction, the second read heads 414a, 414b may each be offset in the y-direction instead. The first read heads 410a, 410b each have a size equal to or greater than the width 458 of a data track 454 (shown in FIG. 4B), and the second read heads 414a, 414b each have a size equal to or greater than the width 458 of a data track 454. The width of the read heads 410a, 410b, 414a, 414b and the offset distance 418 in the cross-track direction ensure that there is at least some overlap between two read heads 410a and 410b or 414a and 414b on a same data track 454.

As discussed above, the write heads 408a, 408b are configured to write data to a plurality of data tracks 454a-454f of the tape 450, and the read heads 410a, 410b are configured to read data from the plurality of data tracks 454a-454f. The data tracks 454a-454f may collectively be referred to as data tracks 454. The servo heads 406 are configured to read data from servo tracks 452a, 452b of the tape 450 to measure the speed and position of the data heads 404a, 404b in order to properly align the data heads 404a, 404b with the respect to the data tracks 454. When writing data to the data tracks, the tape head 400 has a writer width (i.e., similar to the writer width 356 of FIG. 3B) that is greater than the track pitch or track width of the data tracks 454. Thus, after writing a data track 454c, for example, the tape head 400 overwrites a portion of the data track 454c when writing the adjacent data track 454d such that that previously written data track 454c has a smaller overall width 458.

Even though the trimmed data tracks 454 are narrower than the writer width, the first and second read heads 410, 414 are offset in both the in the cross-track direction and the down-track direction such that the first and second read heads 410, 414 overlap on at least one data track 454. Because the first read heads 410 and the second read heads 414 overlap and can each read data from a same data track 454 (e.g., data track 454a) simultaneously, the overall size of the first and second read heads 410, 414 does not need to be reduced in order to read data from the tape 450. Furthermore, due to the first and second read heads 410, 414 being capable of reading data from the same data track 454 simultaneously, the read signal and the signal-to-noise ratio are each increased, resulting in a more reliable read of the data.

As further noted above, trimming the data tracks 454 results in each data track 454 having at least one curved edge or curvature. In some embodiments, all of the first and second read heads 410, 414 of the tape head 400 may be dynamically tilted to align with the curvature of a data track 454a by using an actuator 401 of the tape head 400, like shown in FIGS. 4C-4D. In some embodiments, the actuator 401 is able to dynamically tilt the tape head 400 in order to tilt the first and second read heads 410, 414. The tape head 400 and/or the first and second read heads 410, 414 may be dynamically tilted between about 0 degrees to about 20 degrees. In one embodiment, the tape head 400 and/or the first and second read heads 410, 414 are statically tilted about 6 degrees, and may be dynamically tilted about ±0.1 degrees to about ±0.9 degrees, such as about ±0.5 degrees in order to align with the curvature of the data tracks 454. Tilting the tape head 400 and/or the first and second read heads 410, 414 allows for the data tracks 454 to be fully utilized, as the first and second read heads 410, 414 are able to read data from the curved portions of the data tracks 454.

FIGS. 5A-5B illustrate a symmetric write pole 502 and a symmetric write field 510 of a write head of a data head 500, according to one embodiment. FIGS. 5C-5D illustrate an asymmetric write pole 552 and an asymmetric write field 560 of a write head of a data head 550, according to another embodiment. The data head 500 and the data head 550 may each be a data head 404a or 404b of the tape head 400 of FIG. 4A. Thus, the write pole 502 of FIG. 5A may be within the write head 408a or 408b of the tape head 400 of FIG. 4A, or the write pole 552 of FIG. 5B may be within the write head 408a or 408b of the tape head 400 of FIG. 4A. The data heads 500, 550 may each be within the tape drive 100 of FIGS. 1A-1C. The data heads 500, 550 may each be the tape head module assembly 200 of FIG. 2, such as being one of the plurality of data heads 208A-208G.

As shown in FIG. 5A, the write pole 502 comprises a first corner 502a formed by a first surface 504a and a second surface 504b, a second corner 502b formed by the second surface 504b and a third surface 504c, a third corner 502c formed by the third surface 504c and a fourth surface 504d, and a fourth corner 502d formed by the first surface 504a and the fourth surface 504d. The second surface 504b is parallel to the fourth surface 504d. The first surface 504a has a length 508a that is about equal to a length 508c of the third surface 504c. The second surface 504b has a length 508b greater than the lengths 508a, 508c of the first and third surfaces 504a, 504c, and the first and third surfaces 504a, 504c each have a length 508a, 508c greater than a length 504d of the fourth surface 504d.

The first corner 502a has a first interior angle 506a of about 75 degrees to about 80 degrees, the second corner 502b has a second interior angle 506b of about 75 degrees to about 80 degrees, the third corner 502c has a third interior angle 506c of about 110 degrees to about 115 degrees, and the fourth corner 502d has a fourth interior angle 506d of about 110 degrees to about 115 degrees. The first interior angle 506a and the second interior angle 506b are about the same, and the third interior angle 506c and the fourth interior angle 506d are about the same. The first and second interior angles 506a, 506b are smaller than the third and fourth interior angles 506c, 506d. The write pole 502 is symmetric about a center axis 514. As such, the write field 510 is symmetric about the center axis 514.

FIG. 5B illustrates the data head 500 writing to a data track 525 of a tape, according to one embodiment. Because the write pole 502 is symmetrical, the shingled data 520a, 520b written to the data track 525 has a long hook or higher curvature at the un-trimmed track edge 512, making the trimmed data track 525 highly asymmetrical. As such, the signal-to-noise ratio may be impacted due to reading more track edge noise from the curvature area at the un-trimmed track edge 512.

FIGS. 5C-5D illustrate an asymmetric write pole 552 and an asymmetric write field 560 of a write head of a data head 550, according to another embodiment. As shown in FIG. 5C, the write pole 552 comprises a first corner 552a formed by a first surface 554a and a second surface 554b, a second corner 552b formed by the second surface 554b and a third surface 554c, a third corner 554c formed by the third surface 554c and a fourth surface 554d, and a fourth corner 554d formed by the first surface 554a and the fourth surface 554d. None of the first, second, third, or fourth surfaces 554a-554d are parallel. The first surface 554a has a length 558a that is greater than a length 558b of the second surface 554b, a length 508c of the third surface 508c, and a length 558d of the fourth surface 554d. The length 558d of the fourth surface 554d is smaller than the lengths 558b, 558c of the second and third surfaces 554b, 554c. The length 558b of the second surface 554b is greater than or equal to the length of the third surface 558c.

The first corner 552a has a first interior angle 556a of about 50 degrees to about 55 degrees, the second corner 552b has an interior second angle 556b of about 95 degrees to about 110 degrees, the third corner 552c has a third interior angle 556c of about 110 degrees to about 115 degrees, and the fourth corner 552d has a fourth interior angle 556d of about 110 degrees to about 115 degrees. At least the first and second interior angles 556a-556b are different. The second interior angle 556b is greater than the first, third, and fourth interior angles 556a, 556c, 556d, and the second interior angle 556b is greater than about 90 degrees. In some embodiments, the third and fourth interior angles 556c-556d are the same. The write pole 552 is asymmetric about a center axis 564. As such, the write field 560 is asymmetric about the center axis 564.

FIG. 5D illustrates the data head 550 writing to a data track 575 of a tape, according to one embodiment. The asymmetrical write pole 552 results in the shingled data 570a, 570b having a much smaller hook or less curvature at the un-trimmed track edge 562, resulting in the data track 575 being more symmetrical. As such, the asymmetric write pole 552 improves the signal-to-noise ratio when reading data, as the data track 575 has less track edge noise.

Therefore, by utilizing a dynamically tiltable tape head comprising a plurality of data heads, each data head comprising a write head, a first read head aligned with the write head, and a second read head offset in both the cross-track and down-track directions from the first read head, the first read heads and the second read heads can overlap and can each read data from a same data track simultaneously. Due to the first and second read heads being capable of reading data from the same data track simultaneously, the read signal and the signal-to-noise ratio are each increased, resulting in a more reliable read of the data. Moreover, the overall size of the first and second read heads does not need to be reduced in order to read data from the tape. Additionally, the tape head may be tilted to read data from trimmed tracks of the tape which may be curved, allowing for the first and second read heads to read data from the curved portions of the data tracks.

In one embodiment, a tape head comprises a first module head assembly, comprising: one or more servo heads, and a plurality of data heads, each data head comprising: a write head, a first read head aligned with the write head, and a second read head, the second read head being offset in a cross-track direction and in a down-track direction from the first read head and the write head.

The second read head is offset in the cross-track direction from the first read head a distance equal to or less than a width of a shingled data track on a tape. The second read head is offset in the down-track direction from the first read head a distance of about 100 nm to about 500 nm. The first read head and the second read head each individually has a width greater than or equal to a width of a shingled data track of the tape. The first read head and the second read head are configured to read data from a shingled data track of the tape simultaneously. The write head comprises a symmetric write pole. The write head comprises an asymmetric write pole. The asymmetric write pole comprises: four corners, at least one corner of the four corners having an interior angle greater than about 90 degrees, and four surfaces each having different lengths, the asymmetric write pole configured to generate an asymmetric write field. A tape drive comprising the tape head.

In another embodiment, a tape head comprises a first module head assembly, comprising: one or more first servo heads, and a plurality of first data heads, each first data head comprising: a first write head, a first read head aligned with the first write head, and a second read head, the second read head being offset in a cross-track direction and in a down-track direction from the first read head and the first write head. The tape head further comprises a second module head assembly aligned with the first module head assembly, the second module head assembly comprising: one or more second servo heads, and a plurality of second data heads, each second data head comprising: a second write head, a third read head aligned with the second write head, and a fourth read head, the fourth read head being offset in the cross-track direction and in the down-track direction from the third read head and the second write head.

Each of the first write heads of the first module head assembly are aligned with a second write head of the second module head assembly. Each of the second read heads of the first module head assembly are aligned with a fourth read head of the second module head assembly. The first write head comprises an asymmetric write pole, the asymmetric write pole comprising four corners each having a different interior angle. The second read head is offset in the down-track direction from the first read head a first distance of about 100 nm to about 500 nm. The fourth read head is offset in the down-track direction from the second read head the first distance. The second read head is offset in the cross-track direction from the first read head a second distance equal to or less than a width of a shingled data track on a tape. The fourth read head is offset in the cross-track direction from the second read head the second distance. The first read head and the second read head overlap a first shingled data track of a tape to read data from the first shingled data track simultaneously, and wherein the third read head and the fourth read head overlap a second shingled data track of the tape to read data from the second shingled data track simultaneously. A tape drive comprising the tape head.

In yet another embodiment, a tape drive comprises a first module head assembly, comprising: one or more first servo heads, and a plurality of first data heads, each first data head comprising: a first write head configured to write data to a tape, a first read head aligned with the first write head, and a second read head, the second read head being offset in a cross-track direction and in a down-track direction from the first read head and the first write head, wherein the first read head and the second read head are configured to read data from a first shingled data track of a tape simultaneously, and means for dynamically tilting the first module head assembly.

The first read head and the second read head have a width greater than or equal to a width of the first shingled data track of the tape. The second read head is offset in the cross-track direction from the first read head a distance equal to or less than a width of the first shingled data track. The second read head is offset in the down-track direction from the first read head a distance of about 100 nm to about 500 nm. The tape drive further comprises a second module head assembly, comprising: one or more second servo heads, and a plurality of second data heads, each second data head comprising: a second write head configured to write data to the tape, a third read head aligned with the second write head, and a fourth read head, the fourth read head being offset in the cross-track direction and in the down-track direction from the third read head and the second write head, wherein the third read head and the fourth read head are configured to read data from a second shingled data track of the tape simultaneously. The means for dynamically tilting is further configured to dynamically tilt the second module head assembly. Each of the plurality of first data heads of the first module head assembly is aligned with a second data head of the second module head assembly.

While the foregoing is directed to embodiments of the present disclosure, other and further embodiments of the disclosure may be devised without departing from the basic scope thereof, and the scope thereof is determined by the claims that follow.

What is claimed is:

1. A tape head, comprising:
   a first module head assembly, comprising:
      one or more servo heads; and
      a plurality of data heads, each data head comprising:
         a write head;
         a first read head aligned with the write head; and
         a second read head, the second read head being offset in a cross-track direction and in a down-track direction from the first read head and the write head, wherein the first read head and the second read head each individually has a width greater than or equal to a width of a shingled data track of a tape, and wherein the first read head and the second read head are configured to read data from a shingled data track of the tape simultaneously.

2. The tape head of claim 1, wherein the second read head is offset in the cross-track direction from the first read head a distance equal to or less than a width of a shingled data track on a tape, and wherein the second read head is offset in the down-track direction from the first read head a distance of about 100 nm to about 500 nm.

3. The tape head of claim 1, wherein the write head comprises a symmetric write pole.

4. The tape head of claim 1, wherein the write head comprises an asymmetric write pole.

5. The tape head of claim 4, wherein the asymmetric write pole comprises:
   four corners, at least one corner of the four corners having an interior angle greater than about 90 degrees, and
   four surfaces each having different lengths, the asymmetric write pole configured to generate an asymmetric write field.

6. A tape drive comprising the tape head of claim 1.

7. The tape head of claim 1, wherein the first read head and the second read head of each data head are each individually statically tilted about 6 degrees.

8. A tape head, comprising:
   a first module head assembly, comprising:
      one or more first servo heads; and
      a plurality of first data heads, each first data head comprising:
         a first write head;
         a first read head aligned with the first write head; and
         a second read head, the second read head being offset in a cross-track direction and in a down-track direction from the first read head and the first write head, wherein the first read head and the second read head overlap a first shingled data track of a tape to read data from the first shingled data track simultaneously; and
   a second module head assembly aligned with the first module head assembly, the second module head assembly comprising:
      one or more second servo heads; and
      a plurality of second data heads, each second data head comprising:
         a second write head;
         a third read head aligned with the second write head; and
         a fourth read head, the fourth read head being offset in the cross-track direction and in the down-track direction from the third read head and the second write head, wherein the third read head and the fourth read head overlap a second shingled data track of the tape to read data from the second shingled data track simultaneously.

9. The tape head of claim 8, wherein each of the first write heads of the first module head assembly is aligned with a second write head of the second module head assembly.

10. The tape head of claim 8, wherein each of the second read heads of the first module head assembly is aligned with a fourth read head of the second module head assembly.

11. The tape head of claim 8, wherein the first write head comprises an asymmetric write pole, the asymmetric write pole comprising four corners each having a different interior angle.

12. The tape head of claim 8, wherein the second read head is offset in the down-track direction from the first read head a first distance of about 100 nm to about 500 nm, and wherein the fourth read head is offset in the down-track direction from the third read head the first distance.

13. The tape head of claim 8, wherein the second read head is offset in the cross-track direction from the first read head a second distance equal to or less than a width of a shingled data track on a tape, and wherein the fourth read head is offset in the cross-track direction from the third read head the second distance.

14. A tape drive comprising the tape head of claim 8.

15. The tape drive of claim 14, further comprising an actuator, wherein the actuator is configured to dynamically tilt the tape head.

16. A tape drive, comprising:
   a first module head assembly, comprising:
      one or more first servo heads; and
      a plurality of first data heads, each first data head comprising:
         a first write head configured to write data to a tape;
         a first read head aligned with the first write head; and
         a second read head, the second read head being offset in a cross-track direction and in a down-track direction from the first read head and the first write head, wherein the first read head and the second read head are configured to read data from a first shingled data track of a tape simultaneously; and
   means for dynamically tilting the first module head assembly.

17. The tape drive of claim 16, wherein the first read head and the second read head have a width greater than or equal to a width of the first shingled data track of the tape, wherein the second read head is offset in the cross-track direction from the first read head a distance equal to or less than a width of the first shingled data track, and wherein the second read head is offset in the down-track direction from the first read head a distance of about 100 nm to about 500 nm.

18. The tape drive of claim 16, further comprising:
   a second module head assembly, comprising:
      one or more second servo heads; and
      a plurality of second data heads, each second data head comprising:
         a second write head configured to write data to the tape;
         a third read head aligned with the second write head; and
         a fourth read head, the fourth read head being offset in the cross-track direction and in the down-track direction from the third read head and the second write head, wherein the third read head and the fourth read head are configured to read data from a second shingled data track of the tape simultaneously.

19. The tape drive of claim 18, wherein the means for dynamically tilting is further configured to dynamically tilt the second module head assembly.

20. The tape drive of claim 18, wherein each of the plurality of first data heads of the first module head assembly is aligned with a second data head of the second module head assembly.

* * * * *